(12) United States Patent
Lin

(10) Patent No.: US 8,322,693 B2
(45) Date of Patent: Dec. 4, 2012

(54) MILK FROTH MACHINE

(75) Inventor: Yu-Yuan Lin, Tainan (TW)

(73) Assignee: Uni-Splendor Corp., Tainan (TW)

( * ) Notice: Subject to any disclaimer, the term of this patent is extended or adjusted under 35 U.S.C. 154(b) by 368 days.

(21) Appl. No.: 12/834,010

(22) Filed: Jul. 11, 2010

(65) Prior Publication Data

US 2012/0007260 A1 Jan. 12, 2012

(51) Int. Cl.
*B01F 3/04* (2006.01)
*A23C 1/00* (2006.01)

(52) U.S. Cl. ......... 261/84; 261/119.1; 261/142; 99/452; 99/453; 99/460; 426/519

(58) Field of Classification Search ................ 261/84, 261/119.1, 142; 99/452, 453, 460, 466; 426/519
See application file for complete search history.

(56) References Cited

U.S. PATENT DOCUMENTS

2008/0008806 A1\* 1/2008 Boussemart et al. ......... 426/519
\* cited by examiner

*Primary Examiner* — Robert A Hopkins

(57) ABSTRACT

A milk froth machine includes a base and a top cover. A heating element is electrically connected to a controller mounted in the base. First and second electric connectors are respectively mounted to the base and top cover and electrically connected to the controller. The first and second electric connectors are coupled together when an agitator on the top cover is aligned with a supporting top face of the base. A motor is mounted in the top cover and electrically connected to the second electric connector. A container can be placed on the supporting top face with the agitator extending into the container and with the first and second electric connectors electrically coupled together. The controller controls the motor to drive the agitator to agitate milk in the container to form milk froth or controls the heating element to heat the milk.

4 Claims, 6 Drawing Sheets

US 8,322,693 B2

MILK FROTH MACHINE

BACKGROUND OF THE INVENTION

1. Field of the Invention

The present invention relates to a milk froth machine and, more particularly, to a milk froth machine that can make and heat milk froth while providing use safety, allowing easy cleaning, and saving space.

2. Description of the Related Art

Milk froth is generally added on top of coffee or fruit to improve the taste. Conventionally, milk froth is made by a manually operating an agitator to agitate milk in a container. However, the manual operation is time-consuming, and the milk froth can not be heated. In an approach to solve these disadvantages, a motor is mounted to a center of the container to drive the agitator for making milk froth, and a heating element is mounted around the container to heat the milk froth. However, the resultant milk froth machine is difficult to clean. Furthermore, the milk in the container will leak and come in contact with the heating element or the electric contacts of the motor when the container cracks, resulting in hazard during use. Further, the resultant milk froth machine is bulky.

Thus, a need exists for milk froth machine that can make and heat milk froth while providing use safety, allowing easy cleaning, and saving space.

BRIEF SUMMARY OF THE INVENTION

The present invention solves this need and other problems in the field of easy-to-clean, safe, compact milk froth machines by providing, in a preferred form, a milk froth machine including a base having a housing defining a compartment. The base further includes a supporting portion, a column, and a first engaging portion. The supporting portion includes a supporting top face. The first engaging portion is provided on top of the column. A top cover includes a housing defining a space. The top cover further includes a second engaging portion releasably engaged with the first engaging portion. The top cover further includes an agitator aligned with but spaced from the supporting top face. An electric unit includes a power cord, a controller, a heating element, first and second electric connectors, and a motor. The controller is mounted in the compartment of the base and electrically connected to the power cord that is adapted to be connected to an external power source. The heating element is electrically connected to the controller. The first electric connector is mounted to the first engaging portion and electrically connected to the controller. The second electric connector is mounted to the second engaging portion and electrically connected to the first electric connector. The first and second electric connectors are coupled together when the agitator is aligned with the supporting top face. The motor is mounted in the space of the top cover and operatively connected to the agitator. The motor is electrically connected to the second electric connector. A container adapted to receive milk is placeable on the supporting top face with the agitator extending into the container and with the first and second electric connectors electrically coupled together. The controller controls the motor to drive the agitator to agitate the milk in the container to form milk froth or controls the heating element to heat the milk.

In the most preferred form, the column of the base is higher than the top supporting face, and a receiving space is formed between the top cover and the top supporting face for receiving the container when the second engaging portion of the top cover is engaged with the first engaging portion of the base. The base includes a polygonal groove, and the top cover includes a polygonal periphery received in the polygonal groove, preventing relative rotation between the top cover and the base. Furthermore, the top cover can be engaged with the base in a relation in which the agitator of the top cover is not aligned with the supporting top face of the base and in which the second electric connector is disconnected from the first electric connector. The base further includes a groove in communication with the compartment of the base. A pan is movable between a storage position received in the groove and an operative position outside of the groove for receiving milk dripping from the agitator and a stirring ring on the agitator. The heating element is mounted below the supporting top face of the base. Each of the first and second electric connectors includes a magnetic coupler.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

Figure 1:
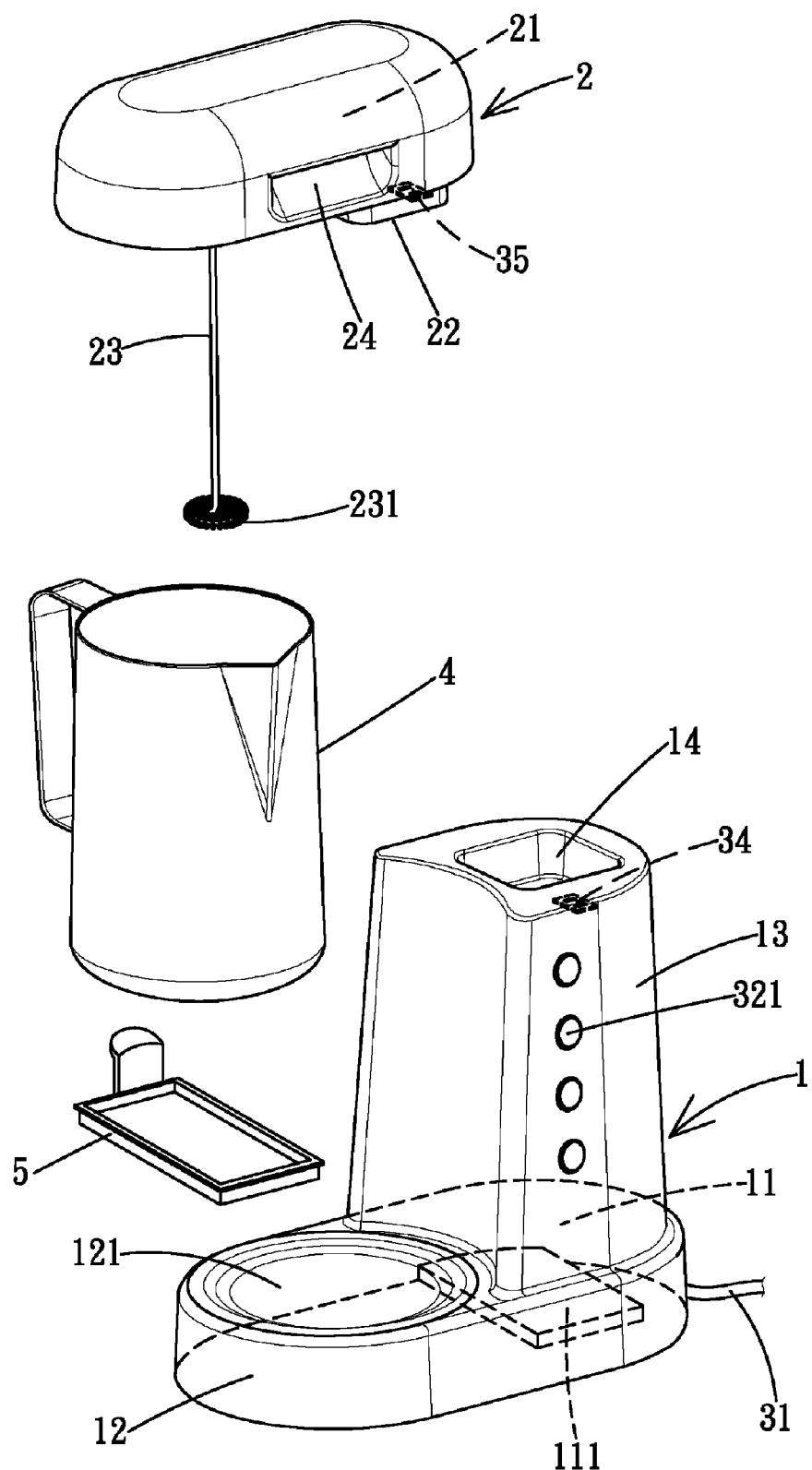
FIG. 1 shows an exploded, perspective view of a milk froth machine according to the preferred teachings of the present invention.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

DETAILED DESCRIPTION OF THE INVENTION

A milk froth machine according to the preferred teachings of the present invention is shown in the drawings and generally includes a base 1, a top cover 2, an electric unit 3, a container 4, and a pan 5. The base 1 includes a housing defining a compartment 11. The base 1 further includes a groove 111 in communication with the compartment 11. The base 1 further includes a supporting portion 12, a column 13, and a first engaging portion 14. The supporting portion 12 includes a supporting top face 121. The first engaging portion 14 is provided on top of the column 13 and in the form of a polygonal groove in the most preferred form shown.

The top cover 2 includes a housing defining a space 21. The top cover 2 further includes a second engaging portion 22 in the most preferred form shown having a polygonal periphery releasably engaged with the first engaging portion 14, preventing relative rotation between the top cover 2 and the base 1. The column 13 of the base 1 is higher than the top supporting face 121. A receiving space 6 is formed between the top cover 2 and the top supporting face 121 for receiving the container 4 when the second engaging portion 22 of the top cover 2 is engaged with the first engaging portion 14 of the base 1. The top cover 2 further includes a downwardly extending agitator 23 aligned with but spaced from the supporting top face 121. The agitator 23 includes a stirring ring 231 at a lower end thereof. The top cover 2 further includes a recessed gripping portion 24 for manual gripping.

The electric unit 3 includes a power cord 31, a controller 32, a heating element 33, first and second electric connectors 34 and 35, and a motor 36. The controller 32 is mounted in the compartment 11 of the base 1 and electrically connected to the power cord 31 that is adapted to be connected to an external power source. The controller 32 can control operation of the agitator 23 to make milk froth and control on/off and the heating temperature of the heating element 33. The controller 32 includes a plurality of buttons 321 to achieve control of the agitator 23 and the heating element 33. The heating element 33 is electrically connected to the controller 32 and mounted below the supporting top face 121 of the base 1. The first electric connector 34 includes a magnetic coupler and is mounted to the first engaging portion 14 and is electrically connected to the controller 32. The second electric connector 35 includes a magnetic coupler and is mounted to the second engaging portion 22 and is electrically connected to the first electric connector 34. The first and second electric connectors 34 and 35 are electrically coupled together when the agitator 23 is aligned with the supporting top face 121. When the agitator 23 of the top cover 2 is not aligned with the supporting top face 121 of the base 1, the second electric connector 35 is disconnected from the first electric connector 34. The motor 36 is mounted in the space 21 of the top cover 2 and operatively connected to the agitator 23. The motor 36 is electrically connected to the second electric connector 35.

The container 4 is adapted to receive milk 7 and is made of stainless steel or other heat-conducting material. The container 4 can be placed on the supporting top face 121 with the agitator 23 extending into the container 4.

The pan 5 is movable between a storage position received in the groove 111 and an operative position outside of the groove 111 for receiving milk dripping from the agitator 23 and the stirring ring 231.

Figure 2:
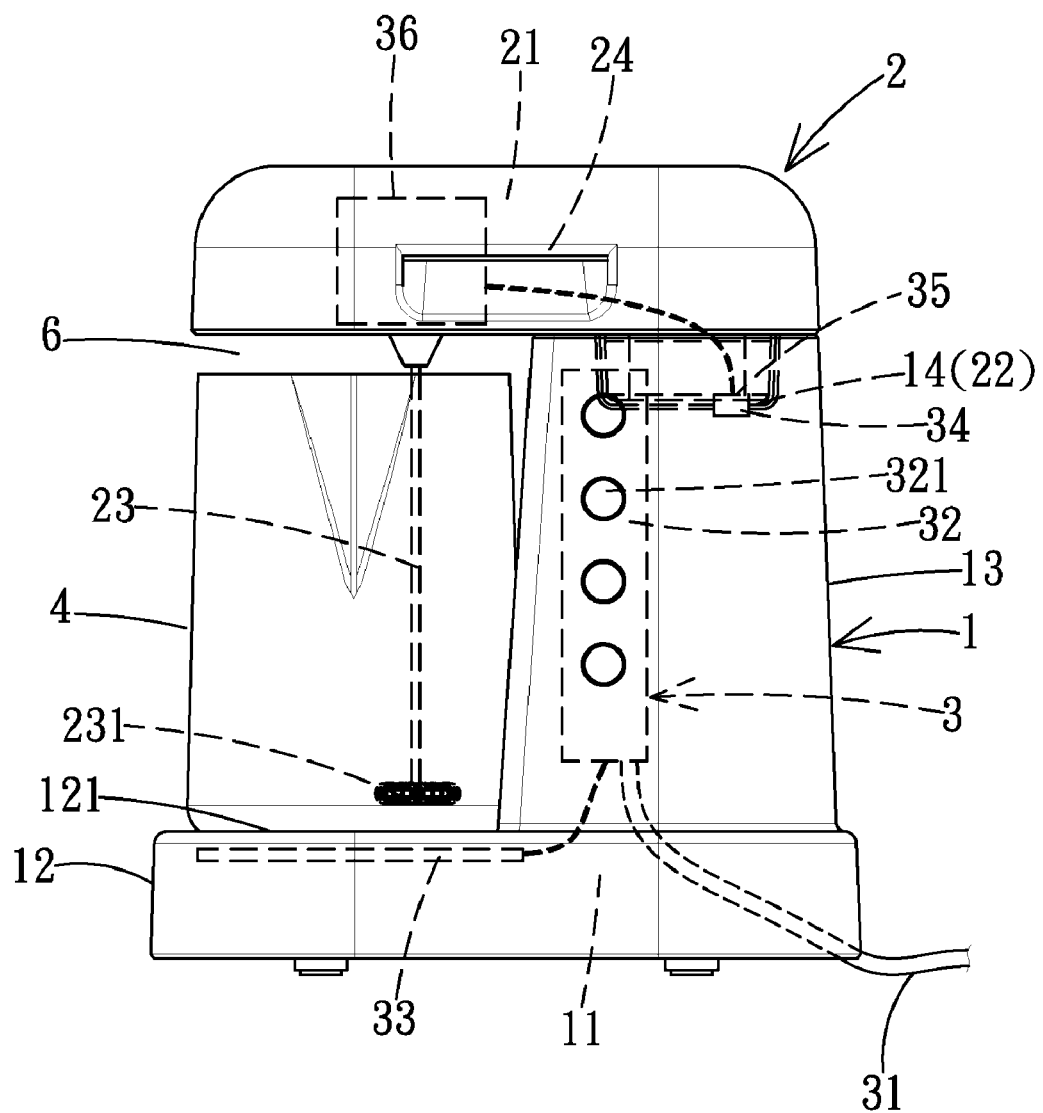
FIG. 2 shows a side elevational view of the milk froth machine of FIG. 1.
Figure 3:
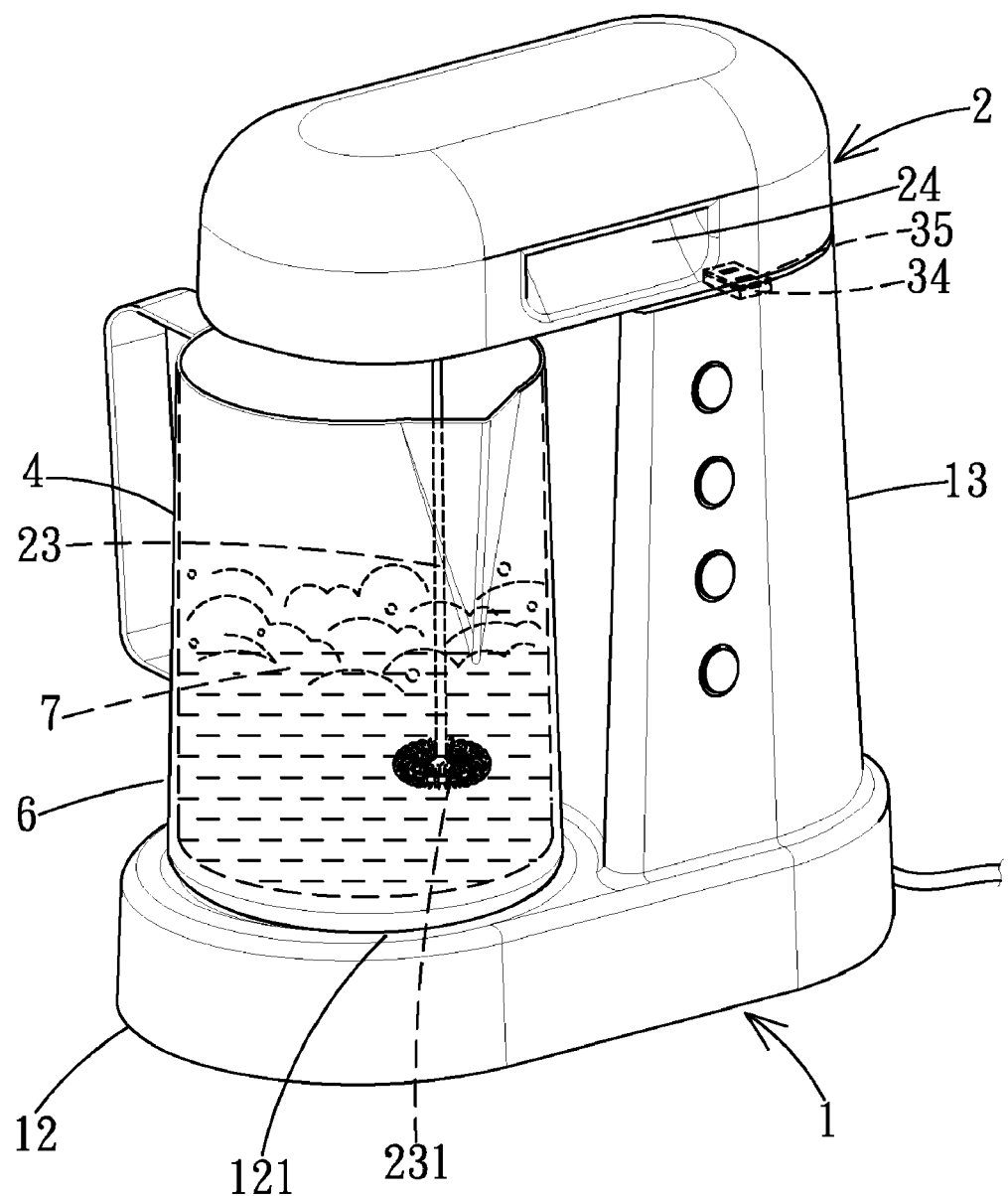
FIG. 3 shows a perspective view of the milk froth machine of FIG. 1.

With reference to FIGS. 1-3, in use, the top cover 2 is firstly detached from the base 1, milk 7 is poured into the container 4, and the container 4 is then placed on the supporting top face 121 with the second engaging portion 22 engaged with the first engaging portion 14 and with the agitator 23 extending into the container 4. The first and second electric connectors 34 and 35 are electrically coupled together. The polygonal design of the first and second engaging portions 14 and 22 prevents rotation of the top cover 2. By pressing the buttons 321, the controller 32 controls the motor 36 to drive the agitator 23 to agitate the milk 7 in the container 4 to form milk froth and/or controls the heating element 33 to heat the milk 7, providing convenient use.

Figure 4:
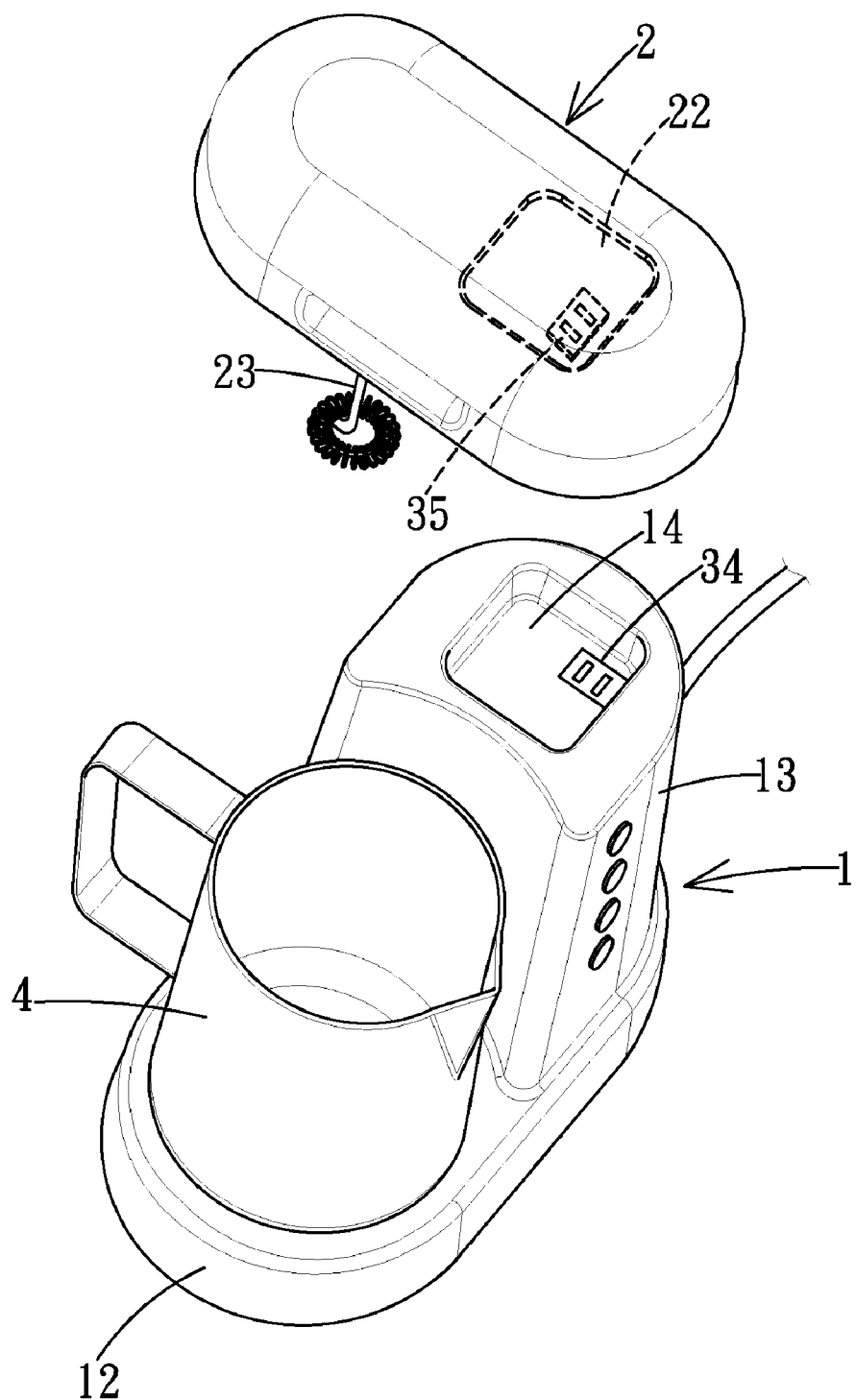
FIG. 4 shows a perspective view of the milk froth machine of FIG. 3 with a top cover detached and rotated through an angle.
Figure 5:
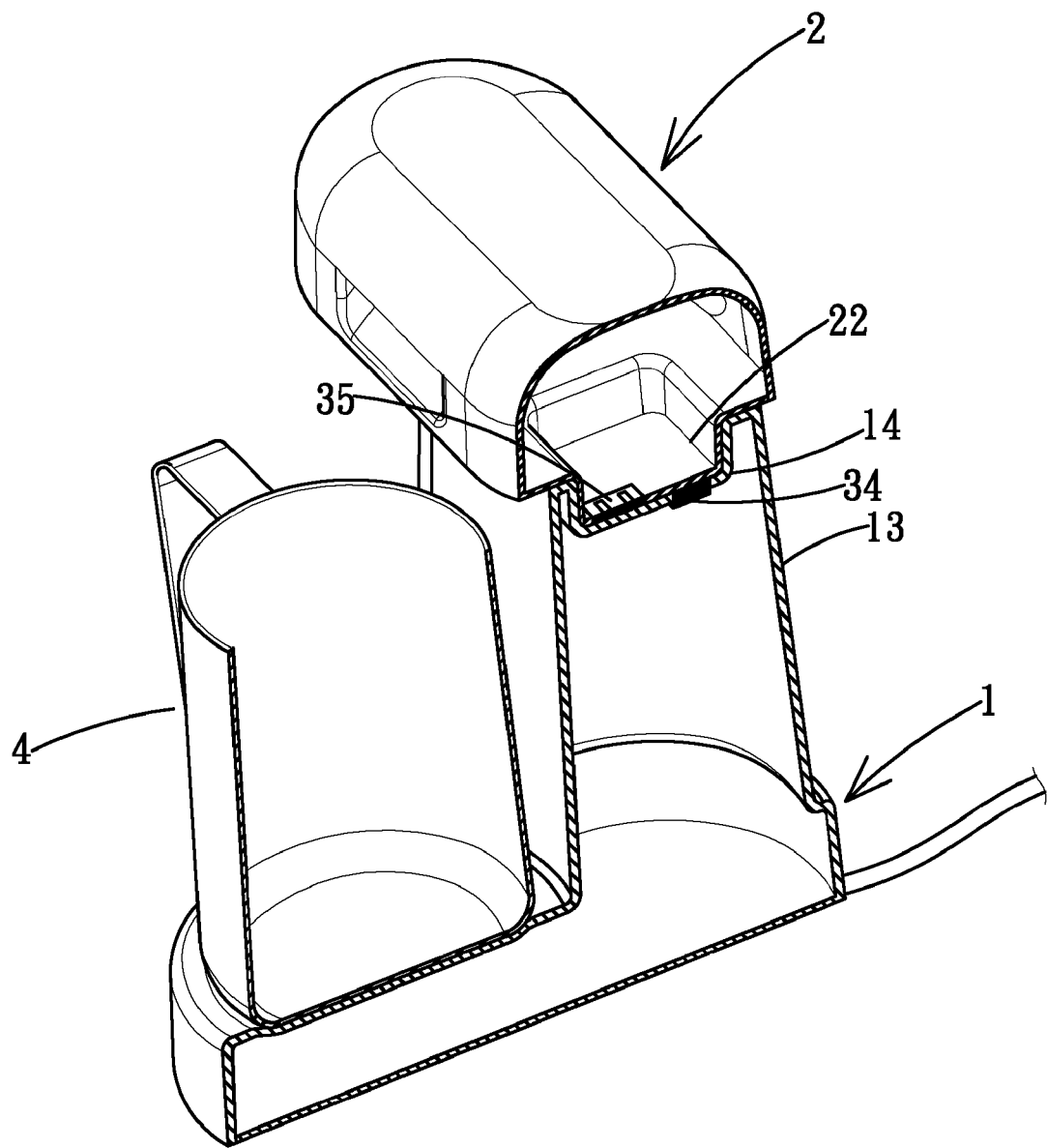
FIG. 5 shows a perspective view of the milk froth machine of FIG. 1 with portions of the milk froth machine broken away.

With reference to FIGS. 4 and 5, after use, the top cover 2 is detached from the base 1 to permit removal of the container 4. Furthermore, the top cover 2 can be rotated through 90° and then reengaged with the base 1 in a relation in which the agitator 23 of the top cover 2 is not aligned with the supporting top face 121 of the base 1 and in which the second electric connector 35 is disconnected from the first electric connector 34. This avoids the top cover 2 from occupying an additional space in the kitchen, enhancing space utility without the risk of accidental activation of the motor 36.

Figure 6:
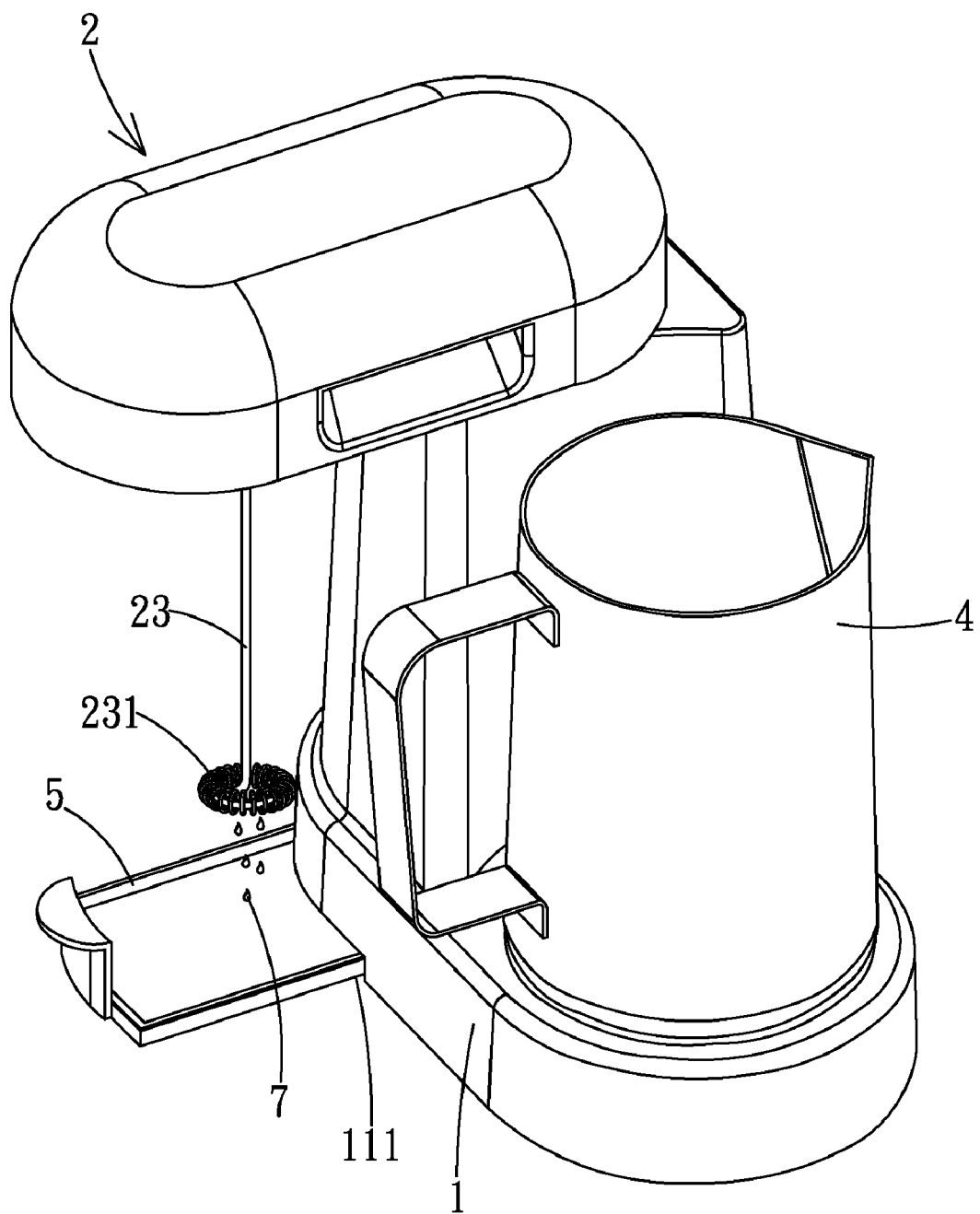
FIG. 6 shows a perspective view of the milk froth machine with a pan in an operative position.

With reference to FIG. 6, the pan 5 can be moved to the operative position below the agitator 23 to collect the milk 7 dripping from the agitator 23 and the stirring ring 231. The pan 5 can be detached from the base 1 for cleaning purposes, providing easy cleaning. Since the container 4 does not include any motor or heating element, convenient, safe use is provided.

It can be appreciated that the first and second engaging portions 14 and 22 of the base 1 and the top cover 2 can be engaged through other provisions other than the polygonal groove and the polygonal periphery. Furthermore, the length of the second engaging portion 22 can be longer while the column 13 of the base 1 can be shorter without causing adverse effect to formation of the space 6 for receiving the container 4 when the top cover 2 is mounted to the base 1. Further, the milk froth machine according to the preferred teachings of the present invention does not have to include the pan 5 and the groove 111 receiving the pan 5.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A milk froth machine comprising, in combination: a base including a housing defining a compartment, with the base further including a supporting portion, a column, and a first engaging portion, with the supporting portion including a supporting top face, with the first engaging portion provided on top of the column; a top cover including a housing defining a space, with the top cover further including a second engaging portion releasably engaged with the first engaging portion, with the top cover further including an agitator aligned with but spaced from the supporting top face; an electric unit including a power cord, a controller, a heating element, first and second electric connectors, and a motor, with the controller mounted in the compartment of the base and electrically connected to the power cord that is adapted to be connected to an external power source, with the heating element electrically connected to the controller, with the first electric connector mounted to the first engaging portion and electrically connected to the controller, with the second electric connector mounted to the second engaging portion and electrically connected to the first electric connector, with the first and second electric connectors coupled together when the agitator is aligned with the supporting top face, with the motor mounted in the space of the top cover and operatively connected to the agitator, with the motor electrically connected to the second electric connector; and a container adapted to receive milk, with the container placeable on the supporting top face with the agitator extending into the container, with the first and second electric connectors electrically coupled together, with the controller controlling the motor to drive the agitator to agitate the milk in the container to form milk froth or controlling the heating element to heat the milk, with the column of the base higher than the top supporting face, with a receiving space formed between the top cover and the top supporting face for receiving the container when the second engaging portion of the top cover is engaged with the first engaging portion of the base, with the base including a polygonal groove, and with the top cover including a polygonal periphery received in the polygonal groove, preventing relative rotation between the top cover and the base.

2. The milk froth machine as claimed in claim 1, with the top cover engageable with the base in a relation in which the agitator of the top cover is not aligned with the supporting top face of the base and in which the second electric connector is disconnected from the first electric connector.

3. The milk froth machine as claimed in claim 2, further comprising, in combination: a pan, with the base further including a groove in communication with the compartment of the base, with the agitator including a stirring ring, with the pan movable between a storage position received in the groove and an operative position outside of the groove for receiving milk dripping from the agitator and the stirring ring.

4. A milk froth machine comprising, in combination: a base including a housing defining a compartment, with the base further including a supporting portion, a column, and a first engaging portion, with the supporting portion including a supporting top face, with the first engaging portion provided on top of the column; a top cover including a housing defining a space, with the top cover further including a second engaging portion releasably engaged with the first engaging portion, with the top cover further including an agitator aligned with but spaced from the supporting top face; an electric unit including a power cord, a controller, a heating element, first and second electric connectors, and a motor, with the controller mounted in the compartment of the base and electrically connected to the power cord that is adapted to be connected to an external power source, with the heating element electrically connected to the controller, with the first electric connector mounted to the first engaging portion and electrically connected to the controller, with the second electric connector mounted to the second engaging portion and electrically connected to the first electric connector, with the first and second electric connectors coupled together when the agitator is aligned with the supporting top face, with the motor mounted in the space of the top cover and operatively connected to the agitator, with the motor electrically connected to the second electric connector; and a container adapted to receive milk, with the container placeable on the supporting top face with the agitator extending into the container, with the first and second electric connectors electrically coupled together, with the controller controlling the motor to drive the agitator to agitate the milk in the container to form milk froth or controlling the heating element to heat the milk, and with each of the first and second electric connectors including a magnetic coupler.

* * * * *